March 21, 1961  A. C. PETERSON  2,975,596
COUNTER FLOW REGENERATIVE GAS TURBINES
Filed Feb. 4, 1957  3 Sheets-Sheet 1

INVENTOR.
Adolphe Peterson

March 21, 1961   A. C. PETERSON   2,975,596
COUNTER FLOW REGENERATIVE GAS TURBINES
Filed Feb. 4, 1957   3 Sheets-Sheet 2

INVENTOR.
Adolph C. Peterson.

March 21, 1961 — A. C. PETERSON — 2,975,596
COUNTER FLOW REGENERATIVE GAS TURBINES
Filed Feb. 4, 1957 — 3 Sheets-Sheet 3
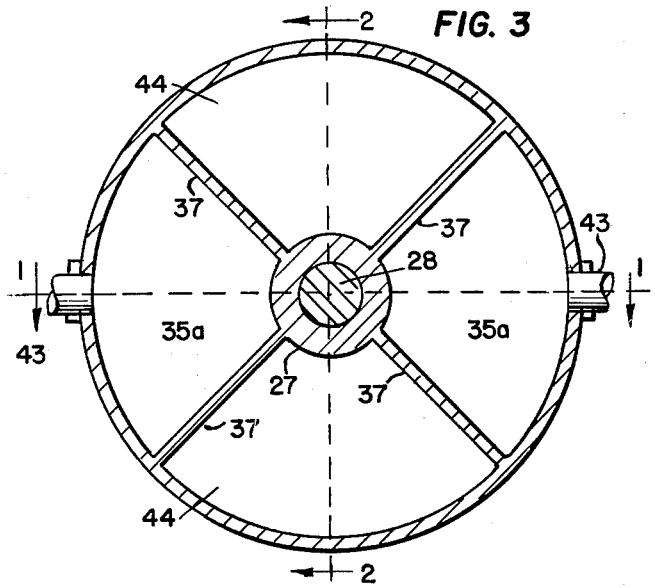
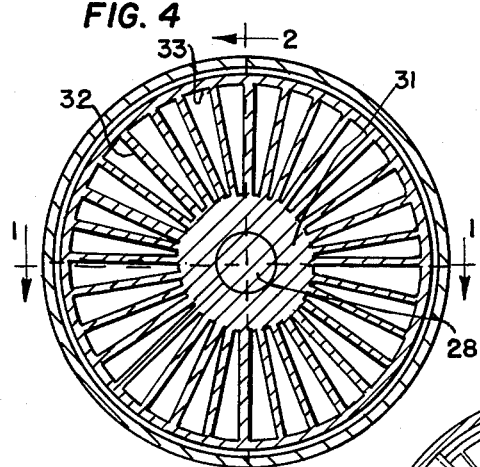
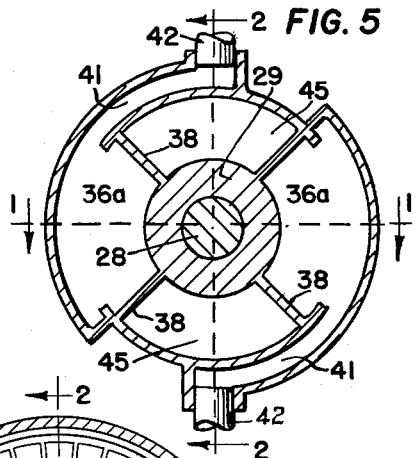
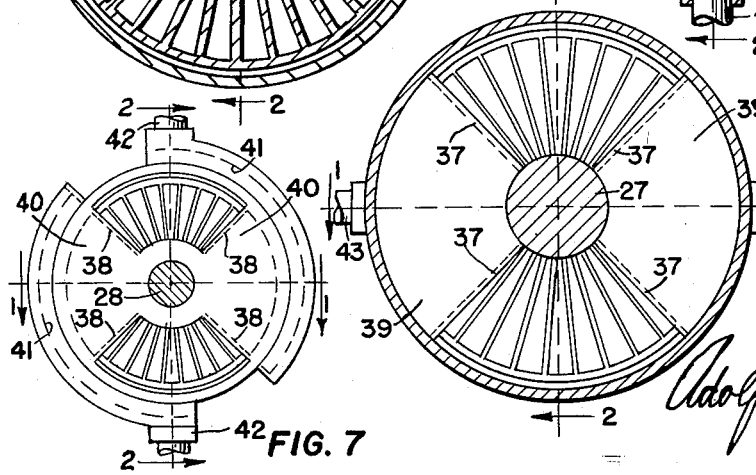
INVENTOR.
Adolphe Peterson

United States Patent Office 2,975,596
Patented Mar. 21, 1961

2,975,596

COUNTER FLOW REGENERATIVE GAS TURBINES

Adolphe C. Peterson, 4623 Bruce Ave. S., Minneapolis, Minn.

Filed Feb. 4, 1957, Ser. No. 638,168

7 Claims. (Cl. 60—39.51)

My invention relates to gas turbines of the type which have regenerative means incorporated for reuse of heat, and it is called—counter-flow regenerative gas turbine.

The principal objects of my invention are to provide a turbine means having regenerative means in a form which results in a more simple and more compact turbine plant than such means as commonly known, and which results in a turbine unit of that class which, due to its more simple and compact construction, is also less costly than such means as commonly known and used. A chief object of my invention is to provide a regenerative turbine unit which due to the counter-flow type of heat regeneration is a more efficient unit than such as are commonly used. A chief object is to provide such means in such a combination with a turbine rotor and power turbine rotor, as will result in a compact complete unit which occupies less space and involves less weight in its construction, so that the complete unit, in its assembled form, will result in a unit well adapted for automotive propulsion of vehicles, together with such efficiency in use, that the unit can therefore provide such a means well adapted for use in automobiles and trucks and buses, especially. In general the object is to improve upon regenerative type turbine.

The principal devices and combinations of devices comprising my invention, are as hereinafter described and as claimed in the appended claims. Referring to the drawings:

Figure 3 is a transverse section on the line 3—3 of Figures 1 and 2.

Figure 1:
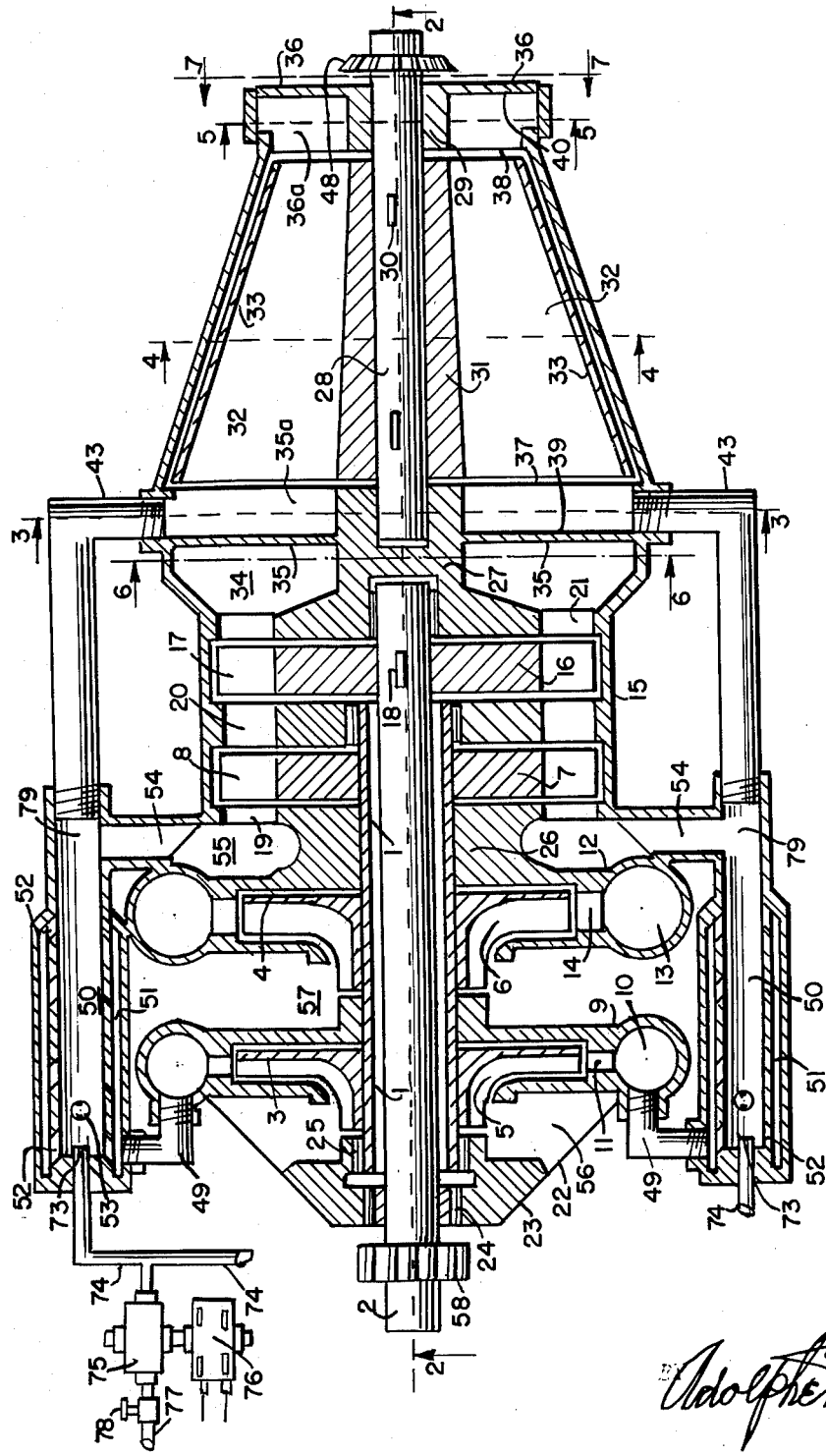
Figure 1 is a view chiefly in horizontal cross section on the lines 1—1 of Figures 2, 3, 4, 5, and on a plane passing through the principal operating elements of the device and through their axes, some parts being in full plan view and some parts broken away.
Figure 2:
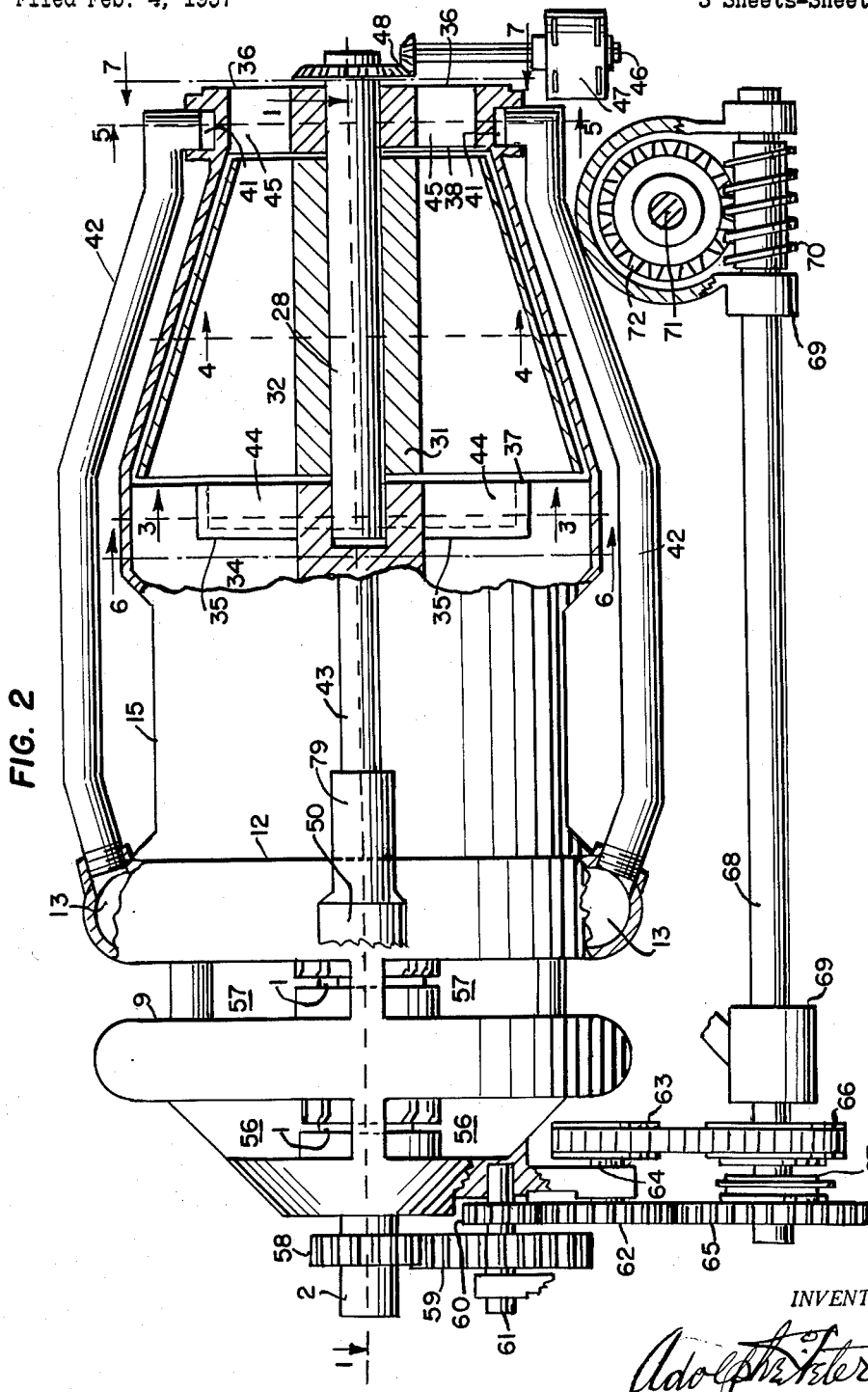
Figure 2 is a view in vertical section on a plane at right angles to that of Figure 1 and on the lines 2—2 if Figures 1, 3, 4, and 5, the section being through the axes of the chief elements, some parts being in full side elevation, some broken away.

Figure 4 is a section transversely of Figures 1 and 2 on the lines 4—4 of Figures 1 and 2.

Figure 5 is a section transversely of Figures 1 and 2 on the lines 5—5 of Figures 1 and 2.

Figure 6 is a section at right angles of Figures 1 and 2, looking rightwardly, this section being on the lines 6—6 of Figures 1 and 2, part in section, chiefly in end elevation of parts viewed to the right of the plane of the section.

Figure 7 is a section at right angles of Figures 1 and 2 looking leftwardly, shaft 28 being in section and the other parts in end elevation looking leftwardly.

Referring to Figures 1 to 5, both inclusive, 1 is a tubular primary turbine shaft, and 2 is a secondary or power turbine shaft, and the latter is for the greater part of its length axially interiorly of the tubular shaft 1 and protrudes at either end axially out of the tubular shaft 1. The tubular shaft 1 has fixed on it, rotatively, two compressor rotors 3 and 4, respectively, each of the centrifugal compressing type having blades 5 and 6, respectively. The tubular shaft 1 has also fixed on it, rotatively, a primary turbine rotor 7 having blades 8. Each of the designated rotors is spaced away from the others a short distance.

A compressor casing 9 is circumferentially of the compressor rotor 3 and has a diffusion annular chamber 10 and diffusion blades 11. A compressor casing 12 is circumferentially of the compressor rotor 4 and has a diffusion chamber 13 annularly, and has diffusion blades 14. A turbine casing 15 is annularly of the primary turbine rotor 7 and is also annularly of the secondary or power turbine rotor 16 which has turbine blades 17 and is rotatively fixed by key means 18 on the extreme rightward end of the turbine shaft 2. The turbine casing 15 has fixed in it nozzle blades 19, intermediate stator blades 20 and the last stage 21 of stator blades or guide blades. The compressor casing 9 by means of spaced radial ribs 22 is mounted on and connects for mounting with a fixture 23 which has a bearing 24 for the left hand end of the turbine shaft 2 and has a bearing 25 for the left hand end of the tubular shaft 1. The compressor casing 12 has fixed with it the bearing 26 which is an intermediate bearing for the shaft 1. The stator blades 20 serve to fix in place the right hand end of shaft 1, and the stator blades guide blades 21 serve to fix in place the bearing 27 for the right hand end of the shaft 2. The bearing 27 also serves as a bearing fixture for the left hand end of the regenerator unit shaft 28, and the latter at its opposite end is rotatably mounted in a bearing 29.

The regenerator shaft 28 has rotatively fixed on it by key means 30, the regenerator rotor 31 which has radially mounted regenerator blades or elements 32, the latter being relatively long, say at least a foot long and in some constructions, say two or three feet or more in length. These regenerator blades 32 are also as long radially of the regenerator shaft 28 as a distance about equal to that of the radial distance of the compressor casings, above designated, at one end of the blades, but they are somewhat shorter at the rightward or opposite ends. The regenerator blades 32 are approximately thirty two in number and may be more or less than that in number, as desired in the construction. An annular shroud 33 is formed on or welded on the radially outward ends of the regenerator blades 32, but the space between blades, at each end is open, so that gases or air may pass between blades, and enter at one end to said spaces and be discharged at the opposite ends of the said spaces.

The regenerator rotor, inclusive of the blades 32, is placed to occupy a position rightwardly of the turbine rotor 16, and the latter is rightwardly of the turbine rotor 7 and its blades; and the regenerator rotor, with its blades 32 is so placed that its axis is substantially the extended axis passing through the turbine shafts, 1 and 2, and so that the regenerator rotor may rotate on an axis which is coincidental with the extended axis of the turbine and compressor shafts, but is so placed that there is an annular turbine discharge chamber 34 between the stage 21 of stator blades, that is the discharge guide blades of the power turbine, and the regenerative control unit 35, which is leftwardly of the regenerator rotor and its blades. A regenerative control unit 36 is rightwardly of the regenerator rotor and its blades 32. The regenerative control units 36 and 35 may otherwise be designated as, respectively, regenerative intake structure and regenerative discharge structure.

The regenerative control units are, one at one end, and the other at the other end of the regenerative rotor unit, so that one controls gases and air at one end and the other controls gases and air at the other end, and this control is such that air under pressure will enter spaces between a number of blades at one end and leave from the same spaces at the opposite end, and so that exhaust gases from the turbines will enter some spaces of the regenerative unit at one end and leave at the other, but so that exhaust gases enter at the ends opposite to that at which air under pressure enters, and so that exhaust gases will be passing through two quarter sections of spaces and so that air under pressure will be entering and passing through two intermediate quarter sections of the spaces. The term quarter-section refers to a sector of the circle about the axis of the regenerator rotor which is appoximately one quarter of the circle about that axis. The spaces referred to may otherwise be designated as channels or as air and gas channels, since each such space alternately serves as an air channel and as an exhaust gas channel.

The regenerative control unit 36 has two intake structures or sections thereof and the regenerative control unit 35 has two discharge structures or sections thereof. The regenerative control units are formed about the bearings of the regenerative rotor and have radial walls designated 37 and 38, respectively, which are parallel to the axis of the rotor, and have the remote wall 39, 40, respectively, and the chambers 35a and 36a, respectively. The ends or edges of the walls 37 or 38, are as close to the adjacent edges or ends of regenerator blades 32, as they may be formed, without interfering with rotation of the rotor 31, so that leakage around ends of the blades 32 may be as little as is possible. Any packing means may be used to reduce that leakage to the minimum. The chambers 35a are open to the ends of spaces between blades 32 at the leftward end of the rotor 31, and the chambers 36a are open to the ends of the spaces between the blades 32 at the rightward end of the rotor 31, but such chambers are otherwise closed to flow of fluid, except that to chambers 36a there is entry and flow of pressure air by means of the ports 41 (two in number) and the air pipes 42, two in number; and except that there is departure and flow of the air under pressure from the spaces, between blades 32 and control chambers 35a, by way of the pipes 43. At the left-hand end of the rotor 31, in the plane of the control unit 35 perpendicularly of the axis of the rotor, there are gas passages 44 through which gases may pass from the annular exhaust gas chamber 34 to spaces or channels between the regenerative blades 32 of the regenerative rotor; and at the right-hand end of the rotor 31, in the control unit 36, there are gas passages 45 through which gases may pass from spaces between regenerator rotor blades 32, directly to atmosphere, rearwardly or rightwardly of the device. The spaces between blades 32 will serve not only as spaces through which hot gases pass to atmosphere, and through which, in alternating periods of time, air under pressure passes for heating, but also as means for some muffling of the gases and sound reduction.

The regenerator shaft 28, having the rotor 31 fixed to it, is rotated by the electric motor shaft 46 and motor 47, through the pair of bevel gears 48, at a rate of speed, such as is determined to be the best speed for the particular construction, and that speed may be as low as fifty rotations per minute, or as high as five hundred rotations per minute, more or less, this speed being contemplated to be that speed which renders the device most efficient in the particular construction. An electric motor is shown as the driving means for the shaft 28 and rotor 31, but it is contemplated that any means for the driving may be used, such as any connecting drive means between the shaft 28 and the turbine shaft 1. The drive means shown, is merely that means which serves best, and most simply, to illustrate a means for driving the shaft 28 and rotor 31.

The annular diffusion chamber 10 of the primary air compressor 3 delivers air under pressure to the pipes 49 and thereby to the two combustion chambers 50, the air passing thereto by way of the surrounding jacket space 51 and the ports 52. The combustion chambers 50, each have an ignition means 53, preferably a spark plug, and each delivers rightwardly (in Fig. 1), to the associated conduit or passage 54 which connects the combustion chamber with one side of the nozzle gas chamber 55 which latter is annular in form and discharges gases by way of the spaces between the nozzle blades 19. Before discharge of gases from the combustion chambers 50 to the nozzle gas chamber, the combustion gases are mixed with heated air under pressure which enters the rightward end of the combustion chambers 50 from the associated ends of the hot air pipes 43 which receive heated air coming from the control unit chambers 35a, and thereby from the spaces where air is heated in the rotor 31. The said air is passed to the control unit chambers 36a, by way of pipes 42, which latter receive compressed air from the annular diffusion chamber 13 as compressed by compressor rotor 4. The compressor rotors 3 and 4, are so proportioned, that, the compressed air flowing to the combustion chambers 50, is in toto, not more than about one-third to one fourth of the total air compression by volume, and so that conversely, the compressed air flowing by way of pipes 42, the regenerative spaces, and pipes 43, to the discharge ends of the combustion chambers 50, is at least two-thirds to three fourths of the total volume of air flow, that is, say three times the volume of air flowing to the combustion ends of the combustion chambers. The air flowing through the regenerative means may be as much as say four or five times the volume of air flowing to the combustion ends of the combustion chambers 50. It is contemplated that the combustion chambers 50 will be sufficiently long, and large in volume, so that combustion will be substantially complete before the end of the combustion chambers is reached by gases, and that the lesser and slower volume of air flow through the combustion chamber, proper, will contribute to fulfillment of this condition, so that it is chiefly combustion gas products that will meet with and mix with heated air at the right hand or discharge end of the combustion chambers 50.

The air passing by way of pipes 43 from the regenerative rotor to the combustion chambers enters the combustion chambers to mix with combustion gases and such fuel as is unconsumed and so mixing with such gases and fuel will contribute to combustion of the fuel in such degree as is necessary and that degree of contribution in any construction will be as determined by the specific construction of the power device. The gases of combustion, before mixing with air, may attain as high a temperature as complete combustion of fuels with a correct volume of air for complete combustion, will produce, and this temperature may be say 2500 degrees Fahrenheit or even more. The gases, however, will meet heated air which has the temperature of say 800 to 1000 degrees Fahrenheit, from pipes 43, and this cools the gases to say 1200 to 1500 or 1600 degrees Fahrenheit before the mixture reaches to the annular nozzle chamber 55 and the turbine blades.

The compressor rotor 3 receives atmospheric air for compression by way of air ports or passages 56, and the compressor rotor 4 receives atmospheric air by way of ports or passages 57. The compression is separate in the compressors, and the compressors may compress to a like pressure of say 80 to 100 pounds, more or less, or the primary compressor 3 may compress to a pressure which is just slightly higher, say only a pound or so, higher than the pressure from the secondary compressor 4, but it is contemplated that these rotors, and the passages will all be so designed, that the air flows described will be attained in the manner which is most efficient for a particular construction.

The turbine shaft 2, at its left hand end, has fixed thereon the small spur gear 58, and that drives through spur gears 59, 60, their connecting shaft 61, and either spur gear 62 or sprocket wheel 63 which are fixed on shaft 64, to the spur gear 65 or sprocket wheel 66, either of which may be clutched by means of a hand controlled double ended dog-clutch (or other clutching means) 67 to the propellor shaft 68, which is rotatable in bearings 69 and has fixed on it the worm 70, which in turn drives road wheel axle 71 through larger worm wheel 72.

The combustion chambers 50 are supplied with fuel by means of fuel nozzles 73 which receive fuel by pipes 74 as pumped by fuel pump 75, the latter being driven by electric motor 76 or any other means for driving the fuel pump, as for instance the commonly used fuel pump driving connection with a turbine shaft.

The general operation is now described, and that is as follows: The regenerator rotor 31 is started in its prescribed rotation: the fuel pump 75 is given its prescribed rotation by motor 76; the clutch means 67 is set for forward or reverse drive: the turbine shaft 1 is started in rotation by any means as commonly used in or with turbines for starting so that turbine drive action may be initiated. There are a number of known means for starting of turbines, and any such means, as adapted to this turbine and its use, may be adopted, and the shaft 1 should be so constructed or associated, as is necessary for this starting, or in lieu thereof, any means for passing a current of air through the turbines, may be used, such means being known and sometimes used.

The device will now take up its cycle of operation, and in such operation, atmospheric air is inducted to each compressor rotor and compressed thereby, the primary compressed air flows to the combustion chambers 50, being divided therebetween, fuel flows to the combustion chambers and is combusted at least in part with the primary air; secondary compressed air, as inducted and compressed by rotor 4, is passed to control unit chambers 36a, thence to spaces, which are aligned with the control units, and as heated thereby, flows to chambers 35a, thence by way of pipes 43 to the discharge ends of the combustion chambers 50; the mixture of air, as heated, and combustion gases, flow by way of passages 54 to the annular nozzle chamber 55, thence through the nozzle guides to the blades of the primary turbine, thence to stator blades, thence to the blades of the secondary, or power turbine rotor, thence to discharge chamber 34 passing by spaces 44 between the two sections or sectors of the regenerative control unit 35 from discharge chamber 34, thence to spaces between regenerator blades, as aligned, thence by way of passages 45 between the two sections or sectors of the regenerative control unit 36 and thereby to atmosphere. In the rotation of the regenerative rotor 31 the spaces or channels between blades 32 move continuously into alignment with the spaces or gas passages 44 and 45 as the channels pass from alignment with the regenerative intake chambers 36a and 35a, so that there is thus a continuous change of channels which are in alignment with passages 44 and 45.

The regenerative rotor blades 32, in rotation, pass through four sections of the rotation, in two of which the blades are interposed in the number of about eight to exhaust gases only; they pass through two sections in which blades are exposed only to air under pressure, the blades being then about eight in number; blades progressively move from one section to the next, and alternate between the air pressure sections and the gas exhaust sections. Thus regenerator blades are exposed in one section to hot exhaust gases, and are heated to say eight hundred to one thousand degrees; then they pass through a section where air is passing and heated to about 800 or nine hundred degrees, more or less; and the hot gas flow is counter to the flow of air. Thus also the exhaust gases are cooled to say about four or five hundred degrees, or less. The air as heated to about 800 degrees or more passes to mix with the combustion gases and sufficiently cool them, and by commingling with the combustion gases to support combustion as may be necessary. Air under pressure from pipes 43 will to an extent be projected into the combustion chambers.

The blades 32, in passing through the four sections of the rotation of the regenerative rotor, are continuously in four sector groups of blades 32 and there will as a result be continuously four so-called sector groups of channels between blades 32 which happen at any moment, of the rotation, to be in any one of the four sections of the rotation. Each sector group continuously has blades and channels leaving the sector group and has blades and channels entering the sector group. For purpose of description channels in a group are designated as—sector group of channels in succession.

The fuel pump 75 receives fuel, such as gasoline or kerosene, or other fuel from a supply pipe 77 and as controlled by a fuel valve 78. The fuel control and supply means is a diagrammatic illustration merely to illustrate such a supply and it is contemplated that any type of such supply and control may be incorporated in the construction.

In each combustion chamber 50, at its extreme rightward end, the space there constitutes a mixing chamber where combustion gases and the heated air from the pipe 43 will mix and result in a mixture of the proper temperature to be delivered to the nozzle chamber 34, and this mixing chamber, in each combustion chamber, or at its rightward end, is designated as 79.

It should be especially noted that the air inducted and compressed is so inducted and compressed in two divisions, one of which goes to the combustion chamber, first passing around its surrounding walls through the jacket space, and that the other division does not go to the combustion chamber directly, but passes through the regenerator heating channels, so that this division is heated by exhaust gases, but that the division which goes to the combustion chambers is not so heated by the regenerative heating means, at all, so that this results in a need for regenerator heating of a relatively smaller volume of air, and that results in an improved efficiency in the regenerative means, in proportion to its size, and that results in a lesser size of the structure, for the purpose.

The blades 32 of the regenerative rotor 31 should at their ends abutting the adjacent ends of walls 37 and 38 of the regenerative control units be in such close contact or near contact with such ends of walls 37 and 38, that there is little or no leakage between ends of blades 32 and adjacent ends of walls 37, 38, as blades move in the rotation of the rotor 31. It is contemplated that any type of packing or other elements, as are known or used in connection with such or any relatively moving devices may be used in any particular construction.

While I have shown particular devices and combinations of devices, in the illustration of my invention, I contemplate that other detailed devices and combinations of devices may be used in the realization of my invention, without departing from the spirit and contemplation thereof.

What I claim is:

1. A turbine construction including: a rotor and regenerative structure having in sequence axially thereof, a bearing structure, a compressor rotor, a second bearing structure, a turbine rotor, a third bearing structure, a regenerative means; the said regenerative means having a round peripheral shape and an axis coincidental with the extended axis of said rotors, and being located substantially in the prolonged round area in sequence from said third bearing structure; the said regenerative means having walls extending radially from said axis and gas channels and air channels formed therethrough and substantially parallel to said axis thereof; a casing structure about said rotor structure and having in sequence an intake to said compressor rotor, a compressor chamber wherein said compressor rotor rotates, a turbine chamber wherein said turbine rotor rotates, an exhaust gas chamber between said turbine chamber and gas channels, and a substantially round housing about said walls of said regenerative means; a shaft means for said compressor rotor and said turbine rotor whereby they are rotatively mounted in said bearing structures; the said casing having support therewith for said bearing structures; an outlet from said compressor chamber and conduit means therefrom to said air channels; a combustion chamber means and conduit means from said air channels to said combustion chamber means and conduit means from said combustion chamber means to said turbine chamber; the said gas channels having exhaust to atmosphere, and being open to said exhaust gas chamber to receive gases therefrom.

2. A turbine construction including: a rotor structure having in sequence axially thereof, a bearing structure, a compressor rotor, a second bearing structure, a turbine rotor, a third bearing structure, a regenerative rotor, a fouth bearing structure; the said regenerative rotor having a round peripheral shape and an axis coincidental with the extended axis of said rotors and being located substantially in the prolonged round area in sequence from said third bearing structure; the said regenerative rotor having heat transfer walls extending radially from said axis and having channels therethrough alternating with said walls, the said walls and channels being substantially parallel with said axis extended; a casing structure about said rotor structure and having in sequence a compressor chamber wherein said compressor rotor rotates, a turbine chamber wherein said turbine rotor rotates, an exhaust gas chamber adjacent said turbine chamber, a regenerative chamber wherein said regenerative rotor rotates; a shaft means for said compressor rotor and said turbine rotor whereby they are rotatively mounted in said first, second and third named bearing structures; a shaft means for said regenerative rotor rotatively mounted in said third and fourth named bearing structures; the said casing having support therewith for said bearing structures; air intake structures formed with said casing structure to be conductive, in rotation of the regenerative rotor, each to sector groups of channels of the regenerative rotor each sector group including a plural number of said channels in succession; an outlet from said compressor chamber and conduit means therefrom to said air intake structures; air discharge structures formed with said casing structure to be receptive, in rotation of the regenerative rotor, each to air from sector groups of channels of the regenerative rotor each sector group including a plural number of said channels in succession; a combustion chamber means and conduit means thereto from said air discharge structures; conduit means from said combustion chamber means to said turbine chamber; alternative sector groups of said channels of the regenerative rotor each sector group including a plural member of said channels in succession being, in its rotation, open at ends adjacent to said exhaust gas chamber to receive gases therefrom and at opposite ends to discharge gases to atmosphere.

3. A turbine construction as defined in claim 2, the said construction being further defined as including: a power turbine rotor mounted to rotate on an axis coincidental with the axis as designated and intermediately of said first named turbine rotor and said regenerative rotor and in a chamber intermediately of said first named turbine chamber and said exhaust gas chamber to be inpelled by exhaust gases passing to said regenerative rotor and through sectors of the channels thereof.

4. A turbine construction as defined in claim 2, the said construction being further defined as including: a power turbine rotor mounted to rotate on an axis coincidental with the axis as designated and intermediately of said first named turbine rotor and said regenerative rotor and in a chamber intermediately of said first named turbine chamber and said exhaust gas chamber to be impelled by exhaust gases passing to said regenerative rotor and through sectors of the channels thereof; the said shaft means of said compressor rotor and first named turbine rotor being tubular, and said power turbine rotor having a shaft means passing axially through said first named shaft means and including power take-off means located in sequence before said first named bearing structure.

5. A turbine construction including: a rotor means having in sequence axially thereof, a compressor rotor, a turbine rotor, a regenerative rotor; a bearing structure for said compressor rotor and turbine rotor, and shaft means connecting the compressor rotor and the turbine rotor for rotation together; a bearing structure for said regenerative rotor; the said regenerative rotor having a round peripheral form and an axis coincidental with the extended axis of said compressor and turbine rotors and being located substantially in the prolonged round area in sequence from said turbine rotor; said regenerative rotor having heat transfer walls extending radially from said axis and having channels therethrough alternated with said heat transfer walls, the said heat transfer walls being substantially parallel with said axis extended; a casing structure about said rotor means and having in sequence, a compression chamber wherein said compression rotor rotates, a turbine chamber wherein said turbine rotor rotates, an exhaust gas chamber adjacent said turbine chamber, a regenerative chamber to which said exhaust gas chamber delivers and wherein said regenerative rotor rotates; the said casing structure having support for said bearing structures; a regenerative intake structure formed with said casing structure and adjacent the end of said regenerative rotor remote from said exhaust gas chamber and receiving air under compression from said compression rotor by conduit means therefrom and formed to deliver the compressed air to a sector group of said channels of said regenerative rotor which sector group of channels are in rotation of the regenerative rotor in juxta-position with the regenerative intake structure; a regenerative discharge structure formed with the casing structure adjacent the end of said regenerative rotor nearest said exhaust gas chamber and receiving compressed air from channels of the regenerative rotor which are in conductive connection with said regenerative intake structure for passage of compressed air therethrough; a combustion chamber means and conduit means from said regenerative discharge structure to said combustion chamber means; means delivering fuel to the combustion chamber means; means whereby gases of the combustion chamber means flow therefrom through nozzle means to said turbine rotor; alternative sector groups of said channels, which in rotation of the regenerative rotor are not in position for said conduction of compressed air from said regenerative intake structure to said regenerative discharge structure, having free entry of exhaust gases from said exhaust gas chamber and having free discharge at their opposite ends to atmosphere by means for such discharge; means for rotating the regenerative rotor about its axis.

6. The device as specified in claim 5, and: the said device being further defined as including; a power turbine rotor mounted to rotate on an axis coincidental with the axis as designated and intermediately of said first named turbine rotor and said regenerative rotor and in a chamber intermediately of said first named turbine chamber and said exhaust gas chamber to be impelled by exhaust gases passing from said first named turbine rotor to said exhaust gas chamber and thereby through channels as defined of said regenerative rotor.

7. The turbine construction as defined in claim 5, and: the said construction being further defined as including; a power turbine rotor mounted to rotate on an axis coincidental with the axis as designated and intermediately of the said first named turbine rotor and said regenerative rotor and in a chamber intermediately of said first named turbine chamber and said exhaust gas chamber to be impelled by exhaust gases passing from said first named turbine rotor to said exhaust gas chamber and thereby through sector groups of said channels as are in rotation of the regenerative rotor in position for discharge of exhaust gases to atmosphere; the said power turbine rotor having a shaft means passing axially through said first named shaft means by a tubular passage therethrough and including at its end beyond said first named shaft means a power take-off means.

References Cited in the file of this patent

UNITED STATES PATENTS

| | | |
|---|---|---|
| 2,195,025 | Couzinet | Mar. 26, 1940 |
| 2,399,394 | Seippel | Apr. 30, 1946 |
| 2,470,184 | Pfenninger | May 17, 1949 |
| 2,541,171 | McGarry | Feb. 13, 1951 |
| 2,591,540 | Grylls | Apr. 1, 1952 |
| 2,757,907 | Williams | Aug. 7, 1956 |
| 2,837,893 | Schirmer | June 10, 1958 |

FOREIGN PATENTS

| | | |
|---|---|---|
| 586,602 | Great Britain | Mar. 25, 1947 |
| 710,959 | Great Britain | June 23, 1954 |